United States Patent Office 3,563,803
Patented Feb. 16, 1971

3,563,803
ALUMINUM-AIR BATTERY
Masayoshi Katoh, Yokohama-shi, Japan, assignor to Furukawa Denchi Kabushiki Kaisha, Yokohama-shi, Japan
Filed Oct. 25, 1968, Ser. No. 770,659
Claims priority, application Japan, Oct. 31, 1967, 42/70,090; June 17, 1968, 43/41,416
Int. Cl. H01m 11/00, 29/04, 39/04
U.S. Cl. 136—86          9 Claims

ABSTRACT OF THE DISCLOSURE

An aluminum-air battery having an anode of aluminum or an alloy thereof and an alkaline electrolyte containing as an additive plumbite, plumbate or stannate, the additive being present in a concentration lower than 0.2 M. The additive inhibits self-corrosion of the aluminum electrode and raises the current efficiency, while limiting the electrolyte temperature with passage of time.

DESCRIPTION OF THE INVENTION

This invention relates to an aluminum-air battery and has for its object to provide such a battery wherein self-corrosion thereof is prevented and a high current efficiency is obtained.

The battery is characterized in that aluminum or an alloy thereof is used for the anode and an alkaline solution such as of NaOH, KOH, LiOH or the like is used for the electrolyte and there is contained in the electrolyte plumbite, plumbate or stannate.

As the plumbite, any substance having the general formula $M_2Pb(OH)_4$, $MPb(OH)_4$, $M_2[Pb(OH)_4]_3$ may be used, and for plumbate, any substance having the general formula $M_2Pb(OH)_6$, $MPb(OH)_6$, $M[Pb(OH)_6]_3$ may be used, wherein M represents a metal. The sodium salt, potassium salt or lithium salt is preferably used and the zinc salt or aluminum salt may also be used.

As the stannate, a substance having the general formula of $M'_2Sn(OH)_6$ ( $M'Sn(OH)_6$, $M'_2[Sn(OH)_6]_3$ may be used, wherein M' is a metal, and $Na_2Sn(OH)_6$ or $K_2Sn(OH)_6$ are preferable.

These salts are usually directly added to the electrolyte, but it is also effective if a chemical compound of lead or tin is added which will produce plumbite, plumbate, or stannate by the chemical reaction thereof with the electrolyte. If, for instance, PbO, $PbO_2$ or $PbO_3$ is added to an alkaline solution such as NaOH, KOH and the like, there may be produced plumbite or plumbate in the electrolyte. If, similarly, SnO or $SnO_2$ is added to the alkaline solution, there may be produced stannate in the electrolyte.

The aluminum battery is a so-called Al-oxygen or Al-air battery which comprises an aluminum anode and a cathode of active material such as oxygen or any oxygen containing material operable in an alkaline electrolyte. As for the oxygen electrode, there is usually used an oxidizer such as a porous sintered carbon electrode.

It is usual in an aluminum-air battery using caustic alkali as the electrolyte, that the self-corrosion of Al is very large but the same is substantially decreased to provide a high current efficiency at the time of current discharging at a higher current density than a predetermined value. If, however, the temperature rises, the current efficiency is rapidly lowered and the self-corrosion becomes very large so that aluminum cannot be effectively used.

Figure 1:
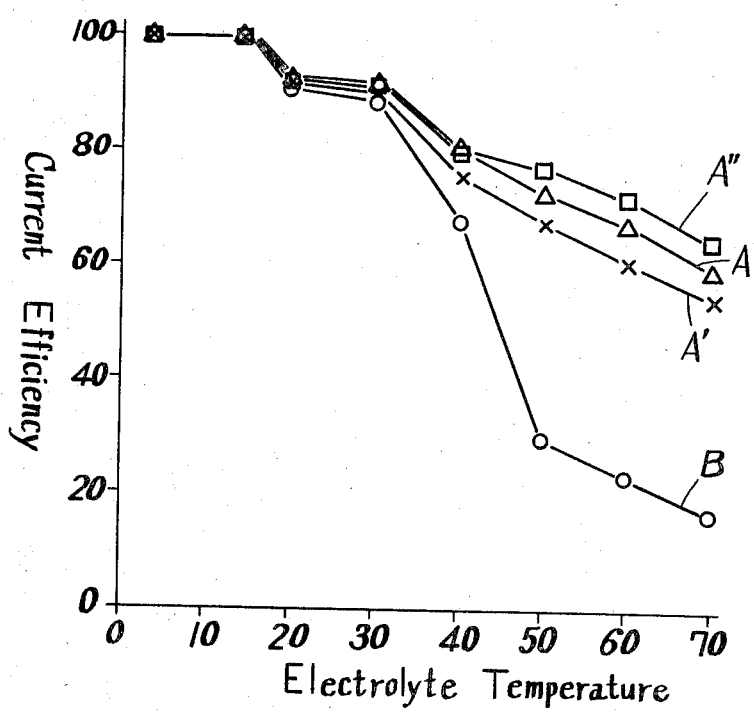
FIG. 1 is a comparison graph diagrammatically showing the relative characteristic features of electrolyte temperature and current efficiency for several embodiments of the aluminum battery according to this invention and that of a conventional aluminum battery.

If, for instance, an aluminum-air battery of 30 ma./cm.$^2$ current flow having an electrolyte of 5 M·KOH and an anode of 99.99% Al, the electrolyte temperature is changed from 0° C. to 70° C., the current efficiency is sharply lowered as the temperature rises as shown by the curve B in FIG. 1. If, however, according to the invention, 0.01 M of potassium plumbite $K_2Pb(OH)_4$ or potassium plumbate KPb(OH) or 0.1 M of sodium stannate $Na_2Sn(OH)_6$ is added to the electrolyte, the current efficiency is not as sharply lowered by the rise of the electrolyte temperature as shown by the curves A, A' and A", respectively, in FIG. 1. This is because the surface of the aluminum electrode is covered by a comparatively dense and thin film of substituted lead or tin.

Figure 2:
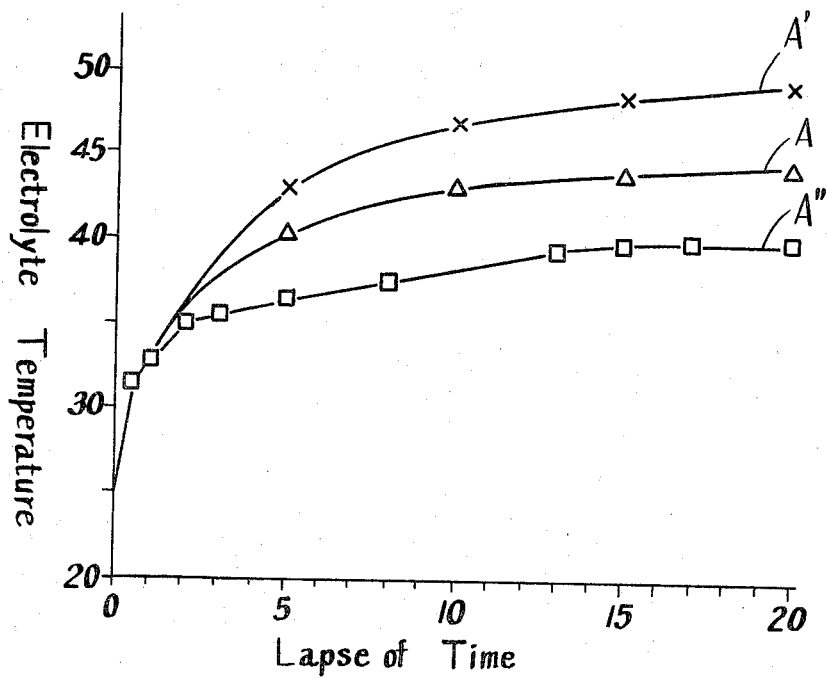
FIG. 2 is a graph showing the change in electrolyte temperature in accordance with lapse of time for aluminum batteries according to the invention.
Figure 3:
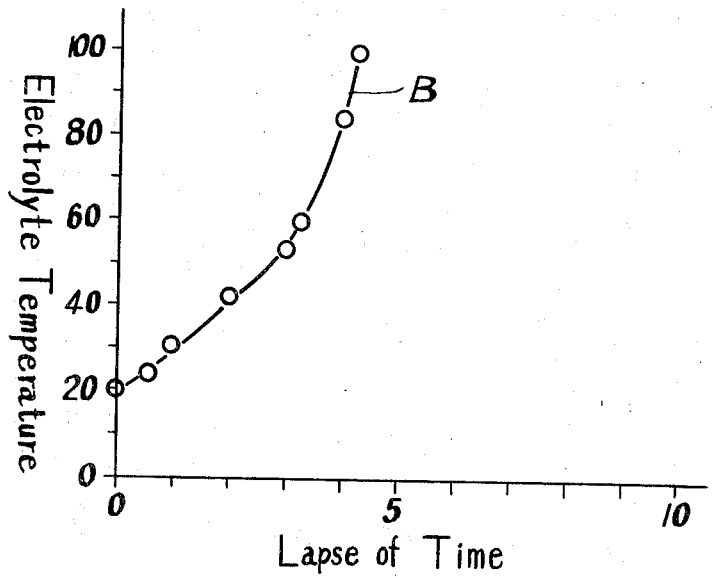
FIG. 3 is a graph showing the change in electrolyte temperature in accordance with lapse of time in the conventional battery.

According to the invention, by the addition of plumbite, plumbate or stannate, there is provided an additional characteristic feature that the electrolyte temperature hardly rises. Namely, for instance, at the time of the discharge of an Al-air battery, the ordinary 5 M·KOH electrolyte (no additive) is raised rapidly in temperature as time passes as shown by the curve B in FIG. 3 to reach boiling in three or four hours, but such an electrolyte with the addition of the 0.01 M of potassium plumbite or potassium plumbate or 0.05 M of sodium stannate $Na_2Sn(OH)_6$ does not rise in temperature above 45° C., 50° C., and 40° C., respectively, as shown by the curves A, A' and A" in FIG. 2. Accordingly, the self-corrosion by the temperature rise can be prevented to obtain always a high current efficiency.

Figure 4:
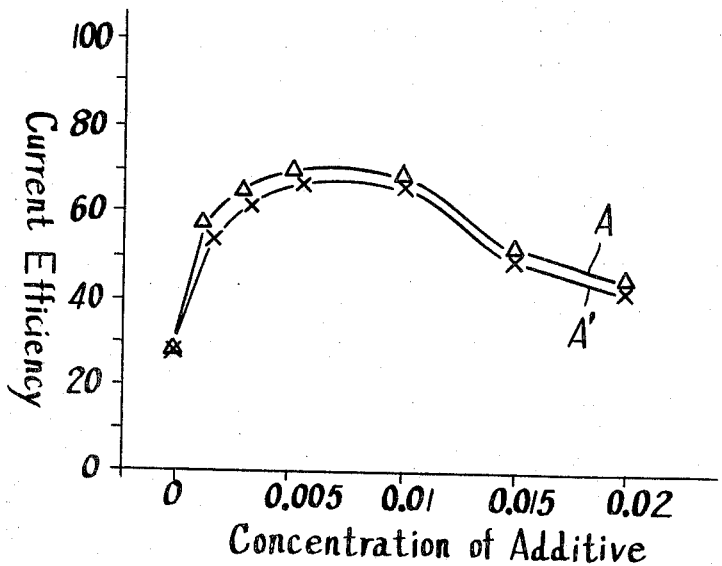
FIG. 4 is a graph showing the influence exerted on the current efficiency by the addition of potassium plumbite and potassium plumbate to aluminum batteries according to the invention.
Figure 5:
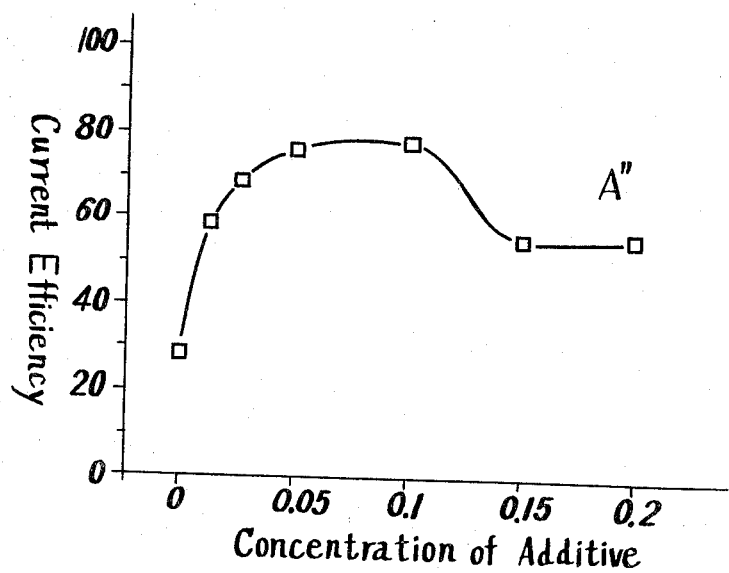
FIG. 5 is a graph showing the influence exerted on the current efficiency by the addition of sodium stannate to the aluminum battery according to the invention.

FIGS. 4 and 5 show the influence exerted on the current efficiency at a temperature of 50° C. and at the current flow of 30 ma./cm.$^2$ in the case when the electrolyte is 5 M·KOH and the electrode is 99.99% Al at various amounts of potassium plumbite, potassium plumbate and sodium stannate. The current efficiency is obviously improved by these additives.

In the case of potassium plumbite or potassium plumbate, the current efficiency becomes a maximum when the concentration is between 0.005 and 0.01 M and is lowered above 0.01 M as shown by the curves A and A' in FIG. 4, and generally good results of current efficiency are obtained with a concentration of below 0.02 M as compared with the conventional battery.

In the case of sodium stannate, the current efficiency becomes a maximum at a concentration of between 0.05 and 0.1 M and is lowered above 0.1 M as shown by the curve A" in FIG. 5, and generally good results regarding current efficiency are obtained when the concentration is below 0.2 M.

Thus, according to this invention, by adding plumbite, plumbate or stannate to the alkali electrolyte in an aluminum battery, self-corrosion of the aluminum electrode can be prevented and the current efficiency can be raised, and this is advantageous when used for a conventional battery of this type.

What is claimed is:

1. An aluminum-air battery in which the anode is aluminum or an alloy thereof and an alkaline electrolyte solution self-corrosive of said aluminum, an improvement comprising an additive in said electrolyte in an amount less than 0.2 M to prevent self-corrosion of said aluminum, said additive being selected from the group consisting of metal plumbites, plumbates, or stannates.

2. An aluminum-air battery as claimed in claim 1 wherein said plumbite is $M_2Pb(OH)_4$, $MPb(OH)_4$ or $M_2[Pb(OH)_4]_3$, M being said metal.

3. An aluminum-air battery as claimed in claim 1 wherein said plumbate is $M_2Pb(OH)_6$, $MPb(OH)_6$ or $M[Pb(OH)_6]_3$, M being said metal.

4. An aluminum-air battery as claimed in claim 1, wherein said stannate is $M_2Sn(OH)_6$, $MSn(OH)_6$ or $M_2[Sn(OH)_6]_3$, M being said metal.

5. An aluminum-air battery as claimed in claim 2 wherein said metal plumbite is potassium plumbite.

6. An aluminum-air battery as claimed in claim 3 wherein said metal plumbate is potassium plumbate.

7. An aluminum-air battery as claimed in claim 4 wherein said metal stannate is sodium stannate.

8. An aluminum-air battery as claimed in claim 1 wherein said metal is an alkali metal.

9. An aluminum-air battery as claimed in claim 8 wherein the electrolyte is an alkali-metal hydroxide.

References Cited

UNITED STATES PATENTS

| | | | |
|---|---|---|---|
| 2,018,563 | 10/1935 | Martus et al. | 136—154X |
| 2,708,683 | 5/1955 | Eisen | 136—20X |
| 2,902,530 | 9/1959 | Eisen | 136—20 |
| 2,994,625 | 8/1961 | Mendelsohn et al. | 136—20X |
| 3,017,448 | 1/1962 | Cahan | 136—20X |
| 3,043,898 | 7/1962 | Miller et al. | 136—86 |
| 3,311,501 | 3/1967 | Ruetschi | 136—20 |
| 2,554,447 | 5/1951 | Sargent | 136—100 |
| 3,513,031 | 5/1970 | Zaromb | 136—86 |

ALLEN B. CURTIS, Primary Examiner

U.S. Cl. X.R.

136—20, 100, 154